United States Patent
Borgonjon et al.

(10) Patent No.: US 7,132,377 B2
(45) Date of Patent: Nov. 7, 2006

(54) DISPOSABLE DISH CARE AND HARD SURFACE CLEANING WIPE

(75) Inventors: Patrice Mar Luc Borgonjon, Mariakerke (BE); Jeffrey Lee Butterbaugh, Cincinnati, OH (US); Edward Paul Fitch, Cincinnati, OH (US); Peter Robert Foley, Cincinnati, OH (US); Francis Cornelio Ford, Cincinnati, OH (US); Brian Jeffreys, Grimbergen (BE)

(73) Assignee: The Procter & Gamble Company, Cincinnati, OH (US)

( * ) Notice: Subject to any disclaimer, the term of this patent is extended or adjusted under 35 U.S.C. 154(b) by 323 days.

(21) Appl. No.: 10/294,868

(22) Filed: Nov. 14, 2002

(65) Prior Publication Data

US 2003/0121530 A1    Jul. 3, 2003

Related U.S. Application Data (60) Provisional application No. 60/332,928, filed on Nov. 16, 2001.

(51) Int. Cl.
 B32B 27/20   (2006.01)
 B32B 5/16    (2006.01)
 B32B 27/04   (2006.01)
 B32B 27/12   (2006.01)
 B32B 5/02    (2006.01)

(52) U.S. Cl. .................. 442/74; 442/93; 442/148; 442/381; 442/382; 442/393; 442/394; 442/401; 442/409; 442/417; 428/114; 428/233; 15/104.93; 15/104.94; 15/118; 15/208; 15/209.1; 510/438

(58) Field of Classification Search .................. 442/74, 442/93, 148, 381, 382, 393, 394, 401, 409, 442/417; 428/114, 233; 15/104.93, 104.94, 15/118, 208, 209.1; 510/438
See application file for complete search history.

(56) References Cited

U.S. PATENT DOCUMENTS

| | | | |
|---|---|---|---|
| 3,324,500 A | 6/1967 | Fuller et al. | |
| 4,138,228 A * | 2/1979 | Hartfelt et al. | 51/295 |
| 4,477,938 A | 10/1984 | Rogut | |
| 4,515,703 A | 5/1985 | Haq | |
| 4,833,003 A * | 5/1989 | Win et al. | 428/198 |
| 4,935,158 A * | 6/1990 | Aszman et al. | 15/104.93 |
| 5,108,642 A | 4/1992 | Aszman et al. | |
| 5,685,935 A * | 11/1997 | Heyer et al. | 156/178 |
| 6,270,878 B1 * | 8/2001 | Wegele et al. | 428/195.1 |
| 6,312,484 B1 * | 11/2001 | Chou et al. | 51/298 |
| 6,340,663 B1 * | 1/2002 | Deleo et al. | 510/438 |
| 6,380,151 B1 * | 4/2002 | Masters et al. | 510/438 |
| 6,652,869 B1 * | 11/2003 | Suazon et al. | 424/402 |
| 6,677,294 B1 * | 1/2004 | Shaw et al. | 510/438 |
| 6,716,805 B1 * | 4/2004 | Sherry et al. | 510/295 |

(Continued)

FOREIGN PATENT DOCUMENTS

EP       0 161 911 A2    11/1985

(Continued)

Primary Examiner—Norca L. Torres-Velazquez
(74) Attorney, Agent, or Firm—Jeffrey V. Bamber; Laura R. Grunzinger (57) ABSTRACT

A disposable dish care and hard surface cleaning wipe is disclosed. In one embodiment, the wipe is comprised of a water insoluble substrate that includes a partially hydrophobic nonwoven first layer, and a low density nonwoven second layer that is adjacent to the said first layer and has melded onto the side facing away from the said first layer an abrasive coating of thermoplastic material nubs or hooks, and a cleaning paste containing a surfactant.

38 Claims, 1 Drawing Sheet

U.S. PATENT DOCUMENTS 6,783,562 B1 * 8/2004 Smith .......................... 51/298
2003/0114069 A1 * 6/2003 Scheubel et al. ........... 442/388

FOREIGN PATENT DOCUMENTS

| EP | 0 211 664 A1 | 2/1987 |
| EP | 0 353 014 B1 | 1/1990 |
| EP | 0 161 911 B1 | 8/1990 |

* cited by examiner

DISPOSABLE DISH CARE AND HARD SURFACE CLEANING WIPE

CROSS-REFERENCE TO RELATED APPLICATIONS

This application is a continuation-in-part of provisional U.S. patent application Ser. No. 60/332,928 filed Nov. 16, 2001.

FIELD OF THE INVENTION

The present invention relates to a disposable wipe for treating a surface, in particular to a disposable wipe for suitable dish care and hard surface cleaning. The disposable wipe herein incorporates a substrate and a cleaning paste comprising a surfactant.

BACKGROUND OF THE INVENTION

Dish care products, particularly hand dishwashing products, have traditionally been marketed in a variety of forms such as scouring powders, pasteous compositions, aqueous liquids and gels. Typically, these products have attempted to satisfy a number of criteria to be acceptable to consumers. These criteria include cleaning effectiveness, in particular effective grease removal and effective cooked-, baked- and burnt-on soils (such as dried-on food residues) removal ("cleaning benefit"). Furthermore, a number of additional benefits have to be satisfied for a hand dishcare product to appeal to consumers such as skin feel, mildness to skin, rinsability and sudsing volume ("additional had dishcare benefits"). Ideal hand dishwashing products should combine both cleaning benefits and benefits"). Ideal hand dishwashing products should combine both cleaning benefits and additional had dishcare benefits. Indeed, ideal hand dishwashing products should effectively remove from dishes soils, such as grease, cooked-, baked- and burnt-on soils and the like, cause little or no irritation to the hands of the user of the hand dishwashing products, should provide a significant amount of suds during the hand dishwashing operation and should be easily rinsable.

It is also highly desirable to deliver the above described cleaning and additional hand dishcare benefits from a disposable product. Disposable products are convenient because they obviate the need to store cumbersome bottles, jars, sprayers, sponges, reusable dishcare cloths, brushes and other forms of clutter including hand dishcare products capable of providing the cleaning, mildness, feel, rinsing and sudsing benefits. Disposable products are also a more sanitary alternative to the use of a sponge, reusable dishcare cloth, brush or other cleaning implement intended for extensive reuse, because such implements can develop bacterial growth, unpleasant odors, and other undesirable characteristics related to repeated use.

The wipes of the present invention surprisingly provide effective cleaning and additional had dishcare benefits in a convenient, inexpensive, and hygienic manner. The present invention provides the convenience of not needing to carry, store or use a separate implement (such as a dish cloth, brush, sponge and the like) and a liquid or powder hand dishwashing detergent. These wipes are convenient to use because they are in the form of either a single, disposable wipes or multiple disposable wipes, which after being wetted are ready for cleaning dishes in a hand dishwash operation as. In addition, the disposable articles of the present invention may be removeably attached to a handle or grip suitable for moving the article over the surface to be cleansed.

The wipes of the present invention are suitable for hand dishcare applications to clean "dishware" including dishes, cups, cutlery, glassware, food storage containers, cooking utensils (cookware) and the like. They may also be useful in cleaning household hard surfaces, in particular hard surfaces found in kitchens such as sinks, worktops, fixtures, appliances etc.

In a further object of the present invention the wipe comprises features which increase the general stiffness of the wipe. Traditional dishcloths are made from relatively flexible fabric making them useful for reaching into the corners of dishware, but are difficult to grip. On the other hand, a scourer or scrubbing sponge is comparatively less flexible and is consequently easier to grip, but is not sufficiently pliable to reach into the corners of dishware. Dishwashing wipes of the type discussed herein can tend to have flexibility of the same order as traditional dishcloths. It is therefore a further benefit of the present dishwashing wipes in that they can be manufactured so as to provide an appropriate level of stiffness in order to balance the needs for gripping the wipe and pliability to reach into corners.

In particular, it would be desirable to improve the stiffness of the wipe when wet. Traditional dishcloths tend to have relatively low stiffness both when dry and when wet. Dish care wipes can give relatively high stiffness when dry, but the stiffness tends to decrease significantly when the wipe is wet. The same applies to synthetic sponges, which exhibit very high dry stiffness, but significantly reduced wet stiffness. In a preferred aspect of the invention the wipe comprises features which increase the ratio of wet stiffness to dry stiffness.

BACKGROUND ART

EP-A-0 211 664 describes a sheet-like article suitable for wiping surfaces comprising at least one substrate layer, the outer surface of which may be abrasive, and a core comprising surfactant entrapped within a polymerization product of a hydroxyalkyl alpha, beta-unsaturated ester, the core also contains a highly absorbent polymeric material.

U.S. Pat. No. 4,515,703 describes an article for wiping surfaces or for releasing an active material, having a closed sandwich structure comprising two substrate layers bonded together in a way to create a plurality of compartments, at least some of which contain an active material, such as soap and at least some of the compartments being provided with one or more perforations in one or both walls for release of the active material.

EP-B-0 353 014 describes a wiping article comprising first and second substrate layers with solid surfactant particles sandwiched between the layers, in which the substrate layers are bonded together by heat-sealable material at the interface between the layers.

EP-A-0 161 911 describes a substantially dry-to-the-touch wiping article comprising an absorbent substrate in the form of a sheet impregnated with detergent active compound and applied onto the absorbent substrate a moisture barrier to cover at least 10% of the area of each side of the sheet.

SUMMARY OF THE INVENTION

The present invention encompasses a disposable dish care and hard surface cleaning wipe comprising:
a) a water insoluble substrate comprising:
   1) a first layer, wherein said first layer is a partially hydrophobic nonwoven; and
   2) a second layer, wherein said second layer is a low density nonwoven and wherein said second layer is adjacent to said first layer and has melded onto the side facing away from said first layer an abrasive coating of thermoplastic material nubs or hooks; and
b) a cleaning paste comprising a surfactant.

In a highly preferred embodiment, said disposable wipe is a disposable dish care wipe, preferably for use in a dish washing operation by hand.

The present invention further encompasses a process of cleaning dishware, preferably by hand, which comprises the steps of: a) wetting the wipe according to the present invention with water and b) contacting the dishware with the wetted wipe.

DETAILED DESCRIPTION OF THE INVENTION

Figure 1:
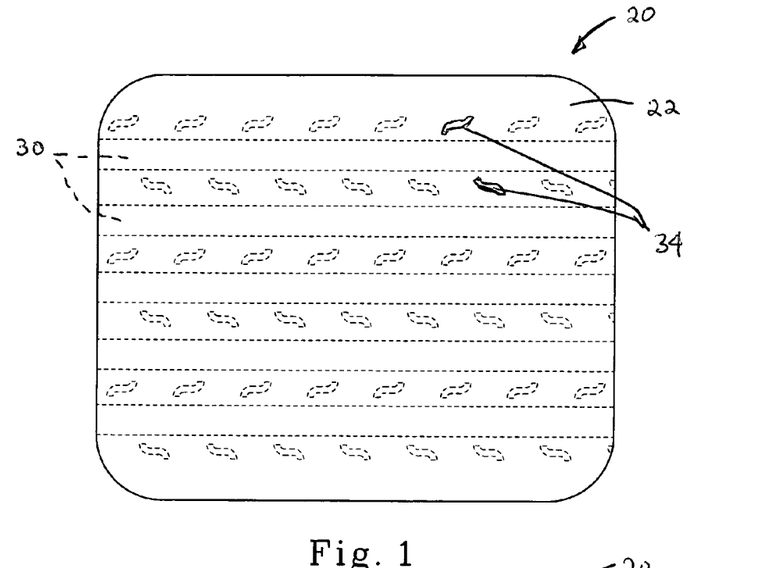
FIG. 1 is a top view of one embodiment of a dishwashing wipe.
Figure 2:
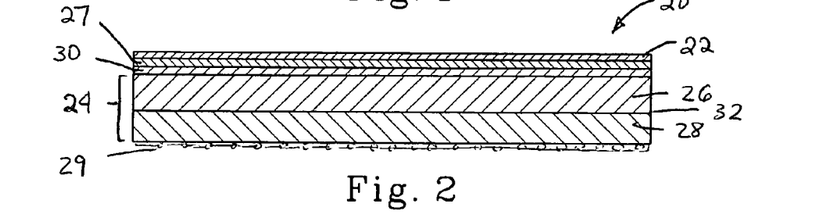
FIG. 2 is a schematic side view of the dishwashing wipe shown in FIG. 1.
Figure 3:
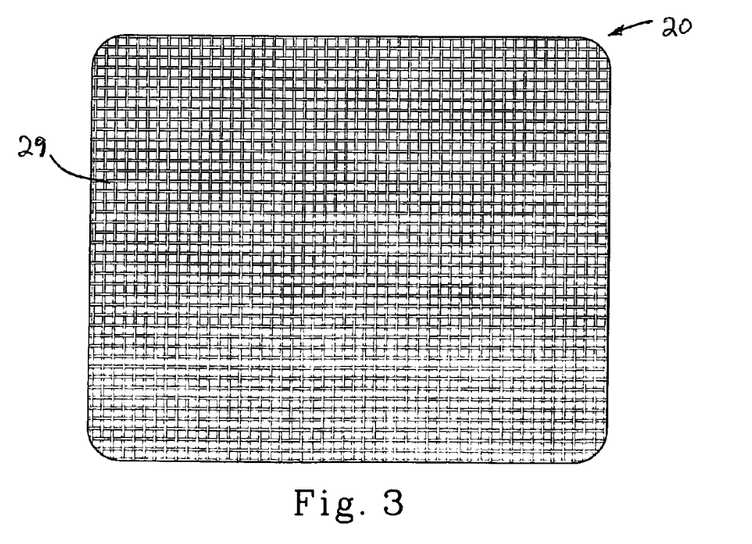
FIG. 3 is a bottom view of the dishwashing wipe shown in FIG. 1.

FIGS. 1–3 show one embodiment of a disposable dishwashing wipe and hard surface cleaning wipe 20. In the embodiment shown in FIGS. 1–3, the wipe 20 comprises at least a first layer 22 comprising a partially hydrophobic nonwoven topsheet and a second layer 24 comprising a low density nonwoven. In the embodiment shown, the second layer 24 comprises two layers of batting, 26 and 28. As shown in FIGS. 1–3, the wipe 20 may also comprise a layer comprising a substantially water-impermeable layer, such as a perforated film 27, located between the first layer 22 and the second layer 24, and a scrim 29 located on the exterior surface of the second layer 24. The wipe 20 further comprises a cleaning paste in the form of several (e.g., five) strips of paste 30 between the perforated film 27 and the layers of batting 26 and 28. The component parts of the wipe 20 are held together by adhesive 32 between the layers of batting 26 and 28, and by bonds 34. The second layer 24 of the wipe 20 can have an abrasive coating of thermoplastic material nubs or hooks melded onto the side facing away from the first layer 22.

As used herein, "disposable" is used in its ordinary sense to mean an article that is disposed or discarded after a limited number of usage events, preferably less than about 25, more preferably less than about 10, and most preferably less than about 2 usage events. For example, a usage event in a hand dishcare operation is defined as being the cleaning by hand dishwashing of a load of dishes that accumulates during one day in a four person family household.

In a preferred embodiment herein the disposable wipes according to the present invention are dry-to-the-touch. By 'dry-to-the-touch' it is meant that the wipes are free of water or other solvents in an amount that would make them feel damp or wet to the touch as compared to the touch of a wet wipe or pre-moistened wipe, wherein a substrate is impregnated (i.e., soaked) in a liquid, and generally low viscosity, composition as for example described in U.S. Pat. No. 5,141,803 or WO 01/38480.

The wipes according to the present invention comprise a cleaning paste having specific rheological and/or morphological properties as described herein below. The combination of the substrate according to the present invention and said cleaning paste preferably results in dry-to-touch wipes. Furthermore, the wipes according to the present invention preferably remain dry-to-the-touch until it is required for use in cleaning a surface as described herein, this means until they are wetted with water in the process of cleaning a surface, preferably dishware, according to the present invention.

In another preferred embodiment herein the disposable wipes according to the present invention are substantially dry. By "substantially dry" it is meant herein that the wipes of the present invention exhibit a Moisture Retention of less than about 3 grams, preferably less than about 2 grams, more preferably less than about 1.5 grams, even more preferably less than about 0.95 grams, even more preferably less than about 0.75 grams, even more preferably less than about 0.5 grams, even more preferably less than about 0.25 grams, even still more preferably less than about 0.15 grams, and most preferably, less than about 0.1 grams. The Moisture Retention is indicative of the dry feel that users perceive upon touching the wipes of the present invention as opposed to the feel of "wet" wipes.

In order to determine the Moisture Retention of the present wipes and other disposable substrate-based products, the following equipment and materials are needed.

| | |
|---|---|
| Bounty ® White Paper Towel | Procter & Gamble SKU 37000 63037 Basis Weight = 42.14 gsm (grams per square meter) |
| Balance | Accurate to 0.0 g |
| Lexan ® (hard, transparent polycarbonate polymer block) | 0.5" thickness large enough to cover samples completely and weighs 1000 g |
| Weight | A 2000 grams weight or combination to equal 2000 grams |

Next, weigh two paper towels separately and record each weight. Place one paper towel on flat surface (e.g. lab bench). Place the sample article on top of that towel. Place the other paper towel on top of sample article. Next, place the Lexan® and then the 2000 grams weight(s) on top of the sandwiched sample article. Wait 1 minute. After the minute, remove weight(s) and Lexan®. Weigh the top and bottom paper towel and record the weight.

Calculate the Moisture Retention by subtracting the initial paper towel weight from the final weight (after 1 minute) for both the top and bottom paper towels. Add the weight differences obtained for the top and bottom paper towels. Assuming multiple articles are tested, average the total weight differences to obtain the Moisture Retention.

The wipes of the present invention are preferably water-activated and are therefore intended to be wetted with water prior to use. As used herein, "water-activated" means that the present invention is presented to the consumer in substantially dry form and/or dry-to-the-touch form to be used after wetting with water. Accordingly, the article is wetted by immersion in water or by placing it under a stream of water.

The wipes according to the present invention may have a length of from about 10 to about 20 cm, a width of from about 10 to about 20 cm and a thickness of from about 2 to about 5 mm.

The disposable dish care and hard surface cleaning wipe of the present invention comprise the following essential components Water Insoluble Substrate The wipes of the present invention comprise a water insoluble substrate, which comprises at least two layers, a first layer and a second layer (preferably a batting layer).

The layers herein have an interior and exterior surface (sides of the layers). In both cases, the interior surfaces of the layers are those which face the inside or innermost portion of the wipe of the present invention whereas the exterior surfaces of the layers are those which face the outside or outermost portion of the article. Indeed, the two interior sides or surfaces of said first and said second layer face each other and are positioned adjacent to each other. However, as described herein below one or more additional layers may be present between said first and said second layer. These additional layers, when present, are sandwiched between said first and said second layer.

Preferably, the substrate layers are of different textures with the first layer being softer than the second layer, which additionally has an abrasive coating melded onto the side facing away from said first layer ("exterior surface"), meaning that the abrasive coating is on one of the outside surfaces of the wipes herein.

Generally, the orientation of the wipes of the present invention may be defined such that said first layer is closer to the side of the article suitable for gripping (i.e., the primary gripping side) while the second layer having an abrasive coating on its outside surface is closer to the side of the article to be contacted with the surface to be cleaned (i.e., the primary dish contact side). Both sides of the article, however, are suitable for contact with the dishware. Indeed, the primary gripping side is also suitable for contact with delicate dishware and for cleaning surfaces other than dishware, for instance counters.

Without being limited by theory, the design described above of the water insoluble substrate enhances the cleaning performance of the wipes herein. The substrate has differing textures on each layer or side such that the gripping side of the article is a different texture from the dish contact side. The substrate may act as an efficient abrasive or even scouring implement. By physically contacting with the dishware the second layer having an abrasive coating, the substrate significantly aids in cleaning and removal of dirt and soil such as grease, burnt-on food residues and other debris. Furthermore, the preferably softer, first layer is suitable for wiping surfaces and/or provides a soft touch for the user of the wipes herein.

Additionally, the first layer and the second layer, as well as additional layers, when present, are preferably bonded to one another in order to maintain the integrity of the article. The layers are preferably heat spot bonded together more preferably using heat generated by ultrasonic sound waves. The bonding may be arranged such that geometric shapes and patterns, e.g. diamonds, circles, squares, etc., are created on the exterior surfaces of the layers and the resulting article.

The bonding pattern can be chosen in order to maximize stiffness of the wipe. This applies in particular when bonding is effected by adhesive (chemical, such as epoxy resin adhesive, or other adhesive) or by ultrasound. Thermal or pressure bonding can be used if the layers to be bonded are appropriate for this. One preferred bonding pattern is application of adhesive or ultrasonic bonding across the full area of the substrate. Generally such patterns do not take up substantially the entire area, but generally not more than 20%, preferably not more than 15%, but preferably at least 5%, of the area of the substrate is covered by bonds.

One preferred application pattern for adhesive, ultrasonic or other bonds is in the form of a number of stripes extending across the width of the substrate. Preferably the stripes are parallel. The direction can be chosen depending upon the direction in which stiffness is required. For instance, if stiffness in the machine direction (this direction being defined in relation to the manufacturing process for the substrate) is required, i.e. it is required to make folding along a line extending in the transverse direction more difficult, then the stripes preferably extend in the machine direction. Conversely, if transverse direction stiffness is required, then preferably stripes extending in the transverse direction are provided.

A particularly preferred bonding pattern is one of two sets of parallel stripes at different angles, for instance in crosshatch form. Such systems can provide the effect of introduction of a net between two layers.

The above patterns for improvement of stiffness are useful when applied to adhesive or ultrasound bonding. However, such patterns can alternatively be applied using hot melt polymer printed onto the substrate, either between layers or on an exterior surface of one of the layers. Such patterns can be applied using any low melting polymer which is flexible after application and drying and capable of producing a continuous film. Suitable polymers include polyethylene. Application of hot melt polymer can be for instance by screen or gravure printing. Screen printing is preferred.

Application of hot melt polymer is preferably on an exterior surface on one of the layers.

Bonding can be effected after all layers intended to form the substrate have been assembled. In some embodiments, however, two or more layers can be pre-bonded prior to contacting these layers with additional layers to form the substrate.

It is also possible to enhance stiffness of the wipe by means of embossing predetermined patterns onto one or more layers. The patterns are advantageously those discussed above in the context of bonding patterns. Embossing can be achieved by application of the desired pattern under pressure at high or low temperature. Alternatively ultrasound methods can be used for embossing.

If any layer is to be embossed it is preferably subjected to embossing prior to contact with other layers intended to form the substrate.

First Layer

The water insoluble substrate of the present invention comprises a first layer, wherein said first layer is a partially hydrophobic nonwoven.

By "partially hydrophobic" it is meant herein that the nonwoven at least partially comprises hydrophobic material. Preferably, the nonwoven of the first layer comprises at least about 40%, more preferably at least about 50%, even more preferably of from about 55% to about 75% of hydrophobic material.

Hydrophobic materials are generally based on synthetic organic polymers. Suitable hydrophobic materials herein are selected from the group consisting of synthetic organic polymers such as, acrylic fibers, modacrylic fibers, polyamide fibers, polyester fibers, polyolefin fibers, polyethylene foam, polyurethane foam, and combinations thereof.

Examples of suitable synthetic materials include acrylics such as acrilan, creslan, and the acrylonitrile-based fiber, orlon; polyamides such as nylons (e.g., nylon 6, nylon 66, nylon 610, and the like); polyesters such as fortrel, kodel, and the polyethylene terephthalate fiber, polybutylene terephthalate fiber, dacron; polyolefins such as polypropylene, polyethylene, and polyurethane foams. Preferably, said hydrophobic materials herein are selected from the group consisting of polyamides, polyethylene terephthalate, and polyolefins.

Materials suitable for the first layer are selected from the group consisting of cellulosic nonwovens, non-lofty nonwovens, and absorbent nonwovens and combinations thereof.

As used herein, "nonwoven" means that the layer does not comprise fibers, which are woven into a fabric. The fibers present in the nonwoven can either be random (i.e., randomly aligned) or they can be carded (i.e., combed to be oriented in primarily one direction).

The first layer may comprise a variety of both natural and synthetic fibers or materials. As used herein, "natural" means that the materials are derived from plants, animals, insects or byproducts of plants, animals, and insects. The conventional base starting material is usually a fibrous web comprising any of the common synthetic or natural textile-length fibers, or combinations thereof.

Suitable natural materials useful in the present invention include, but are not limited to, silk fibers, keratin fibers and cellulosic fibers. Suitable keratin fibers include those selected from the group consisting of wool fibers, camel hair fibers, and the like. Suitable cellulosic fibers include those selected from the group consisting of wood pulp fibers, cotton fibers, hemp fibers, jute fibers, flax fibers, and combinations thereof. Cellulosic fiber materials are preferred in the present invention.

Suitable synthetic materials useful in the present invention include those selected from the group consisting of acetate fibers, acrylic fibers, cellulose ester fibers, modacrylic fibers, polyamide fibers, polyester fibers, polyolefin fibers, polyvinyl alcohol fibers, rayon fibers, polyethylene foam, polyurethane foam, and combinations thereof. Examples of suitable synthetic materials include acrylics such as acrilan, creslan, and the acrylonitrile-based fiber, orlon; cellulose ester fibers such as cellulose acetate, arnel, and acele; polyamides such as nylons (e.g., nylon 6, nylon 66, nylon 610, and the like); polyesters such as fortrel, kodel, and the polyethylene terephthalate fiber, polybutylene terephthalate fiber, dacron; polyolefins such as polypropylene, polyethylene; polyvinyl acetate fibers; polyurethane foams and combinations thereof. These and other suitable fibers and the nonwovens prepared there from are generally described in Riedel, "Nonwoven Bonding Methods and Materials," *Nonwoven World* (1987); *The Encyclopedia Americana*, vol. 11, pp. 147–153, and vol. 26, pp. 566–581 (1984); U.S. Pat. No. 4,891,227, to Thaman et al., issued Jan. 2, 1990; and U.S. Pat. No. 4,891,228, each of which is incorporated by reference herein in its entirety.

Preferred polyolefin fibers are fibers selected from the group consisting of polyethylene, polypropylene, polybutylene, polypentene, and combinations and copolymers thereof. More preferred polyolefin fibers are fibers selected from the group consisting of polyethylene, polypropylene, and combinations and copolymers thereof. Preferred polyester fibers are fibers selected from the group consisting of polyethylene terephthalate, polybutylene terephthalate, polycyclohexylenedimethylene terephthalate, and combinations and copolymers thereof. More preferred polyester fibers are fibers selected from the group consisting of polyethylene terephthalate, polybutylene terephthalate, and combinations and copolymers thereof. Most preferred synthetic fibers of the first layer comprise solid staple polyester fibers, which comprise polyethylene terephthalate homopolymers. Suitable synthetic materials may include solid single component (i.e., chemically homogeneous) fibers, multiconstituent fibers (i.e., more than one type of material making up each fiber), and multicomponent fibers (i.e., synthetic fibers which comprise two or more distinct filament types which are somehow intertwined to produce a larger fiber), hollow fibers and combinations thereof. Preferred fibers include bicomponent fibers, multiconstituent fibers, and combinations thereof. Such bicomponent fibers may have a core-sheath configuration or a side-by-side configuration. In either instance, the first layer may comprise either a combination of fibers comprising the above-listed materials or fibers which themselves comprise a combination of the above-listed materials.

Nonwovens made from natural materials consist of webs or sheets most commonly formed on a fine wire screen from a liquid suspension of the fibers. See C. A. Hampel et al., *The Encyclopedia of Chemistry*, third edition, 1973, pp. 793–795 (1973); *The Encyclopedia Americana*, vol. 21, pp. 376–383 (1984); and G. A. Smook, *Handbook of Pulp and Paper Technologies*, Technical Association for the Pulp and Paper Industry (1986); which are incorporated by reference herein in their entirety.

Natural material nonwovens useful in the present invention may be obtained from a wide variety of commercial sources. Suitable commercially available paper layers useful herein include Airtex®, an embossed air-laid cellulosic layer having a base weight of about 71 gsm, available from James River, Green Bay, Wis.; and Walkisoft®, an embossed air-laid cellulosic having a base weight of about 75 gsm, available from Walkisoft U.S.A., Mount Holly, N.C.

Additional suitable nonwoven materials include, but are not limited to, those disclosed in U.S. Pat. No. 4,447,294, issued to Osborn on May 8, 1984; U.S. Pat. No. 4,603,176 issued to Bjorkquist on Jul. 29, 1986; U.S. Pat. No. 4,981,557 issued to Bjorkquist on Jan. 1, 1991; U.S. Pat. No. 5,085,736 issued to Bjorkquist on Feb. 4, 1992; U.S. Pat. No. 5,138,002 issued to Bjorkquist on Aug. 8, 1992; U.S. Pat. No. 5,262,007 issued to Phan et al. on Nov. 16, 1993; U.S. Pat. No. 5,264,082, issued to Phan et al. on Nov. 23, 1993; U.S. Pat. No. 4,637,859 issued to Trokhan on Jan. 20, 1987; U.S. Pat. No. 4,529,480 issued to Trokhan on Jul. 16, 1985; U.S. Pat. No. 4,687,153 issued to McNeil on Aug. 18, 1987; U.S. Pat. No. 5,223,096 issued to Phan et al. on Jun. 29, 1993 and U.S. Pat. No. 5,679,222, issued to Rasch et al. on Oct. 21, 1997, each of which is incorporated by reference herein in its entirety.

Methods of making nonwovens are well known in the art. Generally, these nonwovens can be made by air-laying, water-laying, meltblowing, co-forming, spunbonding, or carding processes in which the fibers or filaments are first cut to desired lengths from long strands, passed into a water or air stream, and then deposited onto a screen through which the fiber-laden air or water is passed. The resulting layer, regardless of its method of production or composition, is then subjected to at least one of several types of bonding operations to anchor the individual fibers together to form a self-sustaining web. In the present invention the nonwoven layer can be prepared by a variety of processes including, but not limited to, air-entanglement, hydroentanglement, thermal bonding, and combinations of these processes.

Nonwovens made from synthetic materials useful in the present invention can be obtained from a wide variety of commercial sources. Suitable first layer materials useful herein include HEF 40-047®, an apertured hydroentangled material containing about 50% rayon and 50% polyester, and having a basis weight of about 61 grams per square meter (gsm), available from Veratec, Inc., Walpole, Mass.; HEF 140-102®, an apertured hydroentangled material containing about 50% rayon and 50% polyester, and having a basis weight of about 67 gsm, available from Veratec, Inc., Walpole, Mass.; Novonet® 149-616, a thermo-bonded grid patterned material containing about 100% polypropylene, and having a basis weight of about 60 gsm available from Veratec, Inc., Walpole, Mass.; Novonet® 149-801, a thermo-bonded grid patterned material containing about 69% rayon, about 25% polypropylene, and about 6% cotton, and having a basis weight of about 90 gsm, available from Veratec, Inc. Walpole, Mass.; Novonet® 149-191, a thermo-bonded grid patterned material containing about 69% rayon, about 25% polypropylene, and about 6% cotton, and having a basis weight of about 120 gsm, available from Veratec, Inc. Walpole, Mass.; HEF Nubtex® 149-801, a nubbed, apertured hydroentangled material, containing about 100% polyester, and having a basis weight of about 84 gsm, available from Veratec, Inc. Walpole, Mass.; Keybak® 951V, a dry formed apertured material, containing about 75% rayon, about 25% acrylic fibers, and having a basis weight of about 51 gsm, available from Chicopee, New Brunswick, N.J.; Keybak® 1368, an apertured material, containing about 75% rayon, about 25% polyester, and having a basis weight of about 47 gsm, available from Chicopee, New Brunswick, N.J.; Duralace® 1236, an apertured, hydroentangled material, containing about 100% rayon, and having a basis weight from about 48 gsm to about 138 gsm, available from Chicopee, New Brunswick, N.J.; Duralace® 5904, an apertured, hydroentangled material, containing about 100% polyester, and having a basis weight from about 48 gsm to about 138 gsm, available from Chicopee, New Brunswick, N.J.; Chicopee® 5763, a carded hydroapertured material (8×6 apertures per inch, 3×2 apertures per cm), containing about 70% rayon, about 30% polyester, and a optionally a latex binder (Acrylate or EVA based) of up to about 5% w/w, and having a basis weight from about 60 gsm to about 90 gsm, available form Chicopee, New Brunswick, N.J.; Chicopee® 9900 series (e.g., Chicopee 9931, 62 gsm, 50/50 rayon/polyester, and Chicopee® 9950 50 gsm, 50/50 rayon/polyester), a carded, hydroentangled material, containing a fiber composition of from 50% rayon/50% polyester to 0% rayon/100% polyester or 100% rayon/0% polyester, and having a basis weight of from about 36 gsm to about 84 gsm, available form Chicopee, New Brunswick, N.J.; Sontara 8868®, a hydroentangled material, containing about 50% cellulose and about 50% polyester, and having a basis weight of about 72 gsm, available from Dupont Chemical Corp. Preferred nonwoven substrate materials have a basis weight of about from 24 gsm to about 96 gsm, more preferably from about 36 gsm to about 84 gsm, and most preferably from about 42 gsm to about 78 gsm.

The substrate preferably has a weight of from about 20 $gm^{-2}$ to about 200 $gm^{-2}$. More preferably, the substrate has a weight of at least about 20 $gm^{-2}$ and more preferably less than about 150 $gm^{-2}$, more preferably the base weight is in the range of about 20 $gm^{-2}$ to about 120 $gm^{-2}$, and most preferably from about 30 $gm^{-2}$ to about 110 $gm^{-2}$. The substrate may have any caliper. Typically, when the substrate is made by hydroentangling, the average substrate caliper is less than about 1.2 mm at a pressure of about 0.1 pounds per square inch. More preferably the average caliper of the substrate is from about 0.1 mm to about 1.0 mm at a pressure of about 0.1 pounds per square inch (about 0.007 kilograms per square meter). The substrate caliper is measured according to standard EDANA nonwoven industry methodology, reference method #30.4-89.

In a preferred embodiment according to the present invention said first layer is a carded, spunlaced partially hydrophobic nonwoven.

In another preferred embodiment according to the present invention said partially hydrophobic nonwoven of said first layer consists of at least about 40%, preferably of from about 50% to about 75%, more preferably of from about 55% to about 65% of synthetic fibers.

In yet another preferred embodiment according to the present invention said partially hydrophobic nonwoven of said first layer comprises polypropylene and rayon fibers.

Second Layer

The water insoluble substrate of the present invention further comprises a second layer, wherein said second layer is a low density nonwoven. Preferably, said second layer is a batting layer.

By 'batting layer' it is meant herein a nonwoven structure of high loft, resiliency and low density. A "high loft" material is a low density fiber network structure characterised by a high ratio of thickness to mass per unit area.

By 'low density' or lofty nonwoven it is meant herein that the layer has a density of from about 0.00005 $g/cm^3$ to about 0.1 $g/cm^3$, preferably from about 0.001 $g/cm^3$ to about 0.09 $g/cm^3$ and a thickness (caliper) of from about 0.04 inches to about 2 inches at 5 $gms/in^2$.

Said second layer is adjacent to said first layer and has melded onto the side facing away from said first layer an abrasive coating of thermoplastic material nubs or hooks. In a preferred embodiment according to the present invention said second layer has a loft of at least about 1 mm, preferably of from about 2 mm to about 4 mm.

In another preferred embodiment according to the present invention said second layer has a density of from about 0.00005 $g/cm^3$ to about 0.1 $g/cm^3$, preferably from about 0.001 $g/cm^3$ to about 0.09 $g/cm^3$.

Materials suitable for the second layer are selected from the group consisting of cellulosic nonwovens, lofty nonwovens, and absorbent nonwovens and combinations thereof. Preferably, the second layer is a lofty nonwoven.

The second layer may comprise a variety of both natural and synthetic fibers or materials. As used herein, "natural" means that the materials are derived from plants, animals, insects or byproducts of plants, animals, and insects. The conventional base starting material is usually a fibrous web comprising any of the common synthetic or natural textile-length fibers, or combinations thereof.

Suitable natural materials are the same as described herein above in the section titled 'First Layer'.

Suitable synthetic materials are the same as described herein above in the section titled 'First Layer'.

Preferred polyolefin fibers are the same as described herein above in the section titled "First Layer".

Additional suitable nonwoven materials are the same as described herein above in the section titled 'First Layer'.

Methods of making nonwovens are well known in the art. Generally, these nonwovens can be made as described herein above in the section titled 'First Layer'.

Low density nonwoven made from synthetic materials useful in the present invention can be obtained from a wide variety of commercial sources. Suitable second layer materials useful herein include Sorbifelt 14®, a material, having a basis weight of about 120 grams per square meter (gsm), a density of about 0.006 g/cm$^3$ and a loft of about 2 mm commercially available from Libeltex; Air laid nonwovens material, having a basis weight of about 80 grams per square meter (gsm), a density of about 0.008 g/cm$^3$ and a loft of about 1 mm are commercially available from Concert; and Chicopee 4202®, a material, having a basis weight of about 85 grams per square meter (gsm), a density of about 0.005 g/cm$^3$ and a loft of about 1.6 mm commercially available from Chicopee.

In a preferred embodiment according to the present invention said low-density nonwoven consists of polyethylene terephthalate (PET), and bicomponent sheath core fibers made from polyethylene (PE) and polyethylene terephthalate (PET).

In a preferred embodiment according to the present invention said second layer is made of a high loft, low density nonwoven preferably carded through air bonded structure.

In a preferred embodiment the second layer comprises a water-swellable material, that is a material which swells on contact with water. In a particularly preferred embodiment the second layer is a batting layer which comprises swellable material. Suitable swellable materials include cellulosic fibers, sponges, and super-absorbent polymer. Super-absorbent polymer materials can be present, for instance in the form of particles or fibers. If cellulosic materials are used these can be, for instance, in the form of paper or fibrous pulp, in particular air-laid pulp. Air-laid pulp can comprise for instance paper pulp and/or bicomponent fibers. If fibrous materials such as air-laid pulp are used then preferably this comprises at least one material which functions to improve the integrity of a layer. Bicomponent fibers such as polyethylene/polyethylene terephthalate or polyethylene/polypropylene fibers which fuse on heating can have this effect, as can soaking the layer in latex paint.

The second layer may consist essentially of a swellable material but preferably the amount of swellable material is from 10 to 90 wt %, preferably 20 to 80 wt %, based on the weight of the second layer.

Abrasive Coating

The second layer of the wipes according to the present invention has melded onto the side facing away from said first layer an abrasive coating of thermoplastic material nubs or hooks.

By 'the nubs or hooks being melded onto the second layer' it is meant herein that a thermoplastic material-melt is applied onto the exterior surface of the second layer in the form of rounded protuberances or spheres, having a substantially globular shape.

Preferably then the nubs or hooks have an aspect ratio, that is the ratio between the maximum dimension measured in the plane of the substrate and the minimum dimension measured in the plane of the substrate which is close to 1, in particular from 0.5 to 2 preferably 0.8 to 1.2. When cooling, the second layer-facing portion of said thermoplastic material melt forms a bond with the fibers of the second layer. The nubs or hooks formed by the hardened thermoplastic material provide abrasiveness, which during use in a dishcare or hard surface cleaning operation facilitates the removal of soil for the surface to be cleaned.

A suitable thermoplastic material for use as abrasive coating is selected from the group consisting of thermoplastic polymers preferably including: polyethylene and polyethylene copolymer; polypropylene; and specialty polyethylene terephthalate.

Preferably, said thermoplastic material for use as abrasive coating is a hot melt adhesive.

Suitable hot melt adhesives are commercially available from HB Fuller under the trade names NW1034® or HL1014X®. Furthermore, suitable hot melt adhesives are commercially available under the trade name H2128® from Ato Findley.

Preferably said nubs or hooks have a substantially globular shape having a diameter of at least about 200 micrometer, preferably a diameter of from about 300 to about 600 micro-meter, more preferably of from about 300 to about 500 micrometer.

In a preferred embodiment, the nubs or hooks are applied onto the second layer in a regular pattern. Preferably, the nubs or hooks are applied onto the second layer in a regular pattern formed by a multitude of rows of nubs or hooks, wherein neighboring rows are applied in a way so that the offset, i.e., the smaller angle between a row of nubs or hooks (base row) and the line formed by connecting a nub or hook in the base row and a neighboring nub or hook (i.e., a nub or hook in a neighboring row), is preferably about 45°.

A suitable regular pattern has repeating units as shown below:

o o o o o
   o o o o o (row of nubs or hooks)
  o o o o o Preferably, said abrasive coating of thermoplastic material nubs or hooks is applied in an at least about 2 nubs or hooks per square inch (about 2 nubs or hooks per about 6.4516 square centimeter) pattern, preferably of from about 6 nubs or hooks to about 10 nubs or hooks per square inch (about 6 to about 10 nubs or hooks per about 6.4516 square centimeter) pattern, more preferably about 8 nubs or hooks per square inch (about 8 nubs or hooks per about 6.4516 square centimeter) pattern.

The abrasive coating of thermoplastic material nubs or hooks is preferably applied onto said second layer by screen printing.

In a preferred embodiment according to the present invention, the abrasive coating of thermoplastic material has a lower melting point than the low density nonwoven of said second layer. It has been found that this provides the additional benefit of avoiding partially melting the second layer whilst applying the thermoplastic material in the form of a hot melt.

It is preferred that the nubs or hooks are formed from a thermoplastic material having Shore A hardness at least 90 in order to maximize abrasive properties. Examples of such thermoplastic materials are NW 1080 from Fuller or Equistar polyethylene NA 60504.

Additional Layers

Optionally, the substrate herein may comprise one or more optional layers located between said first layer and said second layer.

In a preferred embodiment according to the present invention, the water insoluble substrate herein additionally comprises a third layer formed from substantially water-impermeable material located in-between said first layer and said second layer.

By 'substantially water-impermeable' it is meant herein that the material has a low but not significant level of permeability for water.

Preferably, said third substantially water-impermeable layer is a plastic film more preferably a plastic film made from linear low density polyethylene (LLDPE) and metallocene catalyzed low density polyethylene. Preferably, said plastic film has a thickness of about 0.8 mil (0.02 mm). Preferably, said third water-impermeable layer has an embossed micropattern. It has been found that such an embossed micropattern provides low noise during use. A suitable material for said water-impermeable layer is commercially available from Tregedar under the trade name EMB-685®.

Inclusion of a third substantially water-impermeable layer can increase the stiffness of the wipe. Preferred film materials are polyethylene, in particular low molecular weight polyethylene. Ethylene copolymers may also be used. The melting point of the polymer used for such a film is preferably not more than 120° C.

A preferred thickness is in the range 0.8 to 3 mil (0.02 to 0.07 mm).

A third layer formed from substantially water-impermeable material can in some embodiments comprise perforations large enough to allow permeability of water. This can allow movement of liquid and in particular cleaning composition from one side of the third layer to the other.

In embodiments without perforations the water-impermeable layer can act as a barrier between the cleaning paste and one surface of the wipe. Thus one surface of the wipe can be kept free of cleaning composition and, in use, at least partially free of suds. The barrier layer can also protect the user's hands from high concentrated surfactant paste during use. This can have the advantage of easier gripping and general convenience for the end user.

We find that embodiments in which a layer of substantially water-impermeable material is included between the first and second layers can give improved suds mileage, namely the suds grade remains high for a longer period or for cleaning of a larger number of items of dishware. It also has the advantage that ultrasonic bonding between the first and second layers can be made stronger and carried out with reduced energy input.

A further optional additional layer is a scrim (or mesh) layer. This can be contacted with the exterior surface of the first layer or between the layers but is preferably contacted with the exterior surface of the second layer.

Choice of the properties of a scrim can influence stiffness of the wipes. For instance, the number of strands per centimeter can influence stiffness. A range of 1.5 to 3.5 strands per centimeter, preferably 2.3 strands per centimeter, has been found to be beneficial for strands extending in the machine direction. A range of from 2 to 4 strands per centimeter, preferably 2.2 to 3.4 strands per centimeter, is beneficial for strands extending in the transverse direction. The thickness of the strands, as measured by the basis weight, also influences stiffness. Basis weight in the range 25 to 55 g/m$^2$ is preferred, in particular in the range 30 to 50 g/m$^2$. When the number of strands per centimeter is relatively low, for instance in the range of below 2.3 strands per centimeter machine direction and/or below 2.8 strands per centimeter transverse direction, basis weight is preferably at least 40 g/m$^2$. When the number of strands per centimeter is relatively high, in particular at least 2.4 strands per centimeter machine direction and/or at least 3 strands per centimeter transverse direction, basis weight is preferably not more than 38 g/m$^2$.

The configuration of the strands of the scrim can be chosen so as to improve stiffness. For instance, strands arranged as two parallel series substantially at right angles, i.e. a square or rectangular grid, can give improved stiffness over other arrangements.

If a scrim is used, a single layer may be applied but additional layers can give increased stiffness.

The stiffness of the wipe when wet is an important preferred feature. Stiffness is expressed in Taber stiffness units, preferably measured in accordance with ASTM D-5650 (resistance to bending of paper of low bending stiffness). Stiffness of the wipe when dry is measured before it is used for cleaning a surface. Stiffness of the wipe when wet is measured after it has been saturated in water.

Preferably stiffness when dry is at least 5, preferably at least 6, more preferably at least 7 and in particular at least 8 Taber stiffness units. In particularly preferred cases stiffness when dry is at least 9 Taber stiffness units.

A particular advantage of preferred stiffness-enhancing aspects of the invention is that the Taber stiffness when wet is at least 5, preferably at least 6, more preferably at least 7 and in particular at least 8. In particularly preferred embodiments the stiffness when wet is at least 9 Taber stiffness units.

The particularly preferred embodiments have stiffness when wet at least 50%, preferably at least 60%, more preferably at least 80% and in particular at least 90% of stiffness when dry.

Cleaning Paste

The wipes of the present invention further comprise cleaning paste comprising a surfactant.

All levels (weight %) of the ingredient(s) of the cleaning paste as well as the rheological values herein are given for the cleaning paste as applied onto one or a multitude of the layers of the substrate herein. It has been observed, that upon storage solvents, such as water, when present, or other volatile compounds, when present, may evaporate. This will lead to an increase in the concentration of the non-evaporating compound(s) of the cleaning paste. Furthermore, the solvents, when present, evaporation will lead to a change in the rheology and morphology of said cleaning paste.

By 'paste' it is meant herein that the material is in a solid state and does not continuously change its shape when subjected to a given yield stress preferably of at least 160 Pa (see *An Introduction to Rheology*, H. A. Barnes, et. al.). The cleaning paste flows under increased pressure and has a reduction in viscosity by its increasing temperature.

Said rheological properties include but are not limited to a high yield value, shear sensitive viscosity profile, and desired viscoelastic properties for processing and consumer use.

Preferably, the cleaning paste has a yield stress of at least about 160 Pa, more preferably of from about 250 Pa to about 1000 Pa.

By 'yield stress' it is meant herein the amount of pressure required to initiate flow of the cleaning paste. The yield stress of a given cleaning paste can be measured by using a cone and plate rheometer. A Rheometrics SR-200® fitted with a 40 mm HDPE (0.4 radian) cone and a 316SS® stainless Peltier plate at a 0.0483 mm gap (based upon the 0.4 radian cone's truncation height) operated at a temperature of 20° C. at atmospheric temperature and pressure. The yield stress is obtained by plotting from rest (up curve) shear rate/shear stress on the y-axis by the shear stress on the x-axis as described in *A Comparison of Techniques for Measuring Yield Stresses* by A. S. Yoshimura and R. K. Prud'homme (*Journal of Rheology* 31(8); 1987). The yield stress is then obtained by plotting a line whereby the yield stress or yield point is found at the deviation from that linear behavior.

Preferably, the cleaning paste has a Power Law viscosity profile: consistency (K) from about 30000 to about 10000000 and a shear index (n) from about 0.50 to about 0.20. More preferably, the cleaning paste has a Power Law viscosity profile of K from about 200000 to about 3500000 and n from about 0.25 to about 040.

By 'Power Law, Consistency, and shear index' it is meant herein the shear behavior under stress as measured from a plot of shear rate or strain by the viscosity. The shear behavior of a given cleaning paste can be measured by using a cone and plate rheometer. A Rheometrics SR-200® fitted with a 40 mm HDPE (0.4 radian) cone and a 316SS® stainless Peltier plate at a 0.0483 mm gap (based upon the 0.4 radian cone's truncation height) operated at a temperature of 20° C. at atmospheric temperature and pressure. The shear behavior is obtained by plotting using shear viscosity data as stress is taken away (down curve) by plotting shear stress on the y-axis by the shear rate on the x-axis as described in *Rheology: Principles, Measurements, and Applications* by C. W. Macosko (VCH Publishers, 1994). The shear behavior is then obtained by running a regression of a logarithmic-logarithmic plot using linear regression to obtain the consistency (K) value from the y-intercept and the shear index (n) from the slope of said plot.

The rheological properties of the cleaning paste are tailored to meet specific product requirements and consumer habits. In particular, several surfactant release issues of the cleaning paste are: controlling water ingress and subsequent aqueous surfactant solution migration to the surface to be cleaned, extrusion of surfactant cells leading to waste, and smearing of surfactant during scrubbing yielding a less desired fast surfactant release profile. In order to reduce smearing and extrusion of the surfactant leading to undesired waste, the yield value of the cleaning paste, the amount of pressure required to initiate flow, should be near the upper range of the highest pressure exerted on the wipe during use. The shear versus viscosity effect should be such that water ingress is reduced by the layer's viscosity increase but that the surfactant paste can smear to the desired extent to release an aqueous surfactant solution for cleaning.

The phase chemistry is another highly desired property of the cleaning paste that leads to a desirable release profile. Indeed, the preferred surfactant interfacial phase, between the surfactant and water during use, of the surfactant present in the cleaning paste is the hexagonal or middle phase. The hexagonal phase limits dissolution of the surfactant with water thus increasing the surfactant system's longevity.

The cleaning paste herein may be applied onto said first layer, said second layer and/or optional additional layer(s), when present. Furthermore, the cleaning paste herein may be applied onto the interior and/or exterior surfaces of one or several layer(s) of the substrate of the wipe according to the present invention.

Preferably, the cleaning paste herein is applied onto said second layer, more preferably the cleaning paste herein is applied onto said second layer on the side facing said first layer. Indeed, the cleaning paste is most preferably deposited onto the interior surface of the second layer.

The cleaning paste herein may be equally distributed over the full surface of the layer(s) it is deposited on or applied onto a part of the surface of the layer(s) it is deposited on. Preferably, said cleaning paste is applied onto a part of the surface of the layer(s) it is deposited on, more preferably said cleaning paste is applied onto a part of the surface of said second layer.

In a preferred embodiment according to the present invention, the cleaning paste is applied onto parts of at least one of the layers herein, preferably said second layer, by a stripe pattern. More preferably, said stripe pattern has at least about 1 stripe, preferably of from about 1 to about 6 stripes, more preferably about 3 to about 6 stripes, and even more preferably about 5 stripes. Preferably, the stripe or stripes of the stripe pattern extend over the full length of the substrate. The stripe or stripes of the stripe pattern may have a width of at least about 3 mm, preferably of from about 5 mm to about 15 mm.

In a preferred embodiment herein, the cleaning paste herein covers at least about 30% of the surface of at least one of the layers herein, preferably of said second layer, more preferably of the surface of said second layer facing said first layer, preferably, the cleaning paste herein covers of from about 40% to about 60% of the surface of at least one of the layers herein, preferably of said second layer, more preferably of the surface of said second layer facing said first layer.

The wipes of the present invention comprise from about 10% to about 1,000%, preferably from about 50% to about 600%, and more preferably from about 100% to about 250%, based on the weight of the water insoluble substrate, of the cleaning paste. The wipes of the present invention preferably comprise at least about 4.5 grams of said cleaning paste.

Surfactant

The cleaning paste comprises a surfactant or a mixture thereof.

Preferably, said surfactant selected from the group consisting of: anionic surfactant, amphoteric surfactant, nonionic surfactant, and zwitterionic surfactant, and mixtures thereof.

Preferred anionic surfactants are alkyl ethoxy sulfate surfactants. Preferred nonionic surfactants are alcohol ethoxylates. Preferred amphoteric surfactants are amine oxides.

Choice of surfactant can also influence stiffness of the wipe. In particular, choice of a high plasticity surfactant is beneficial in improving stiffness.

In a preferred embodiment, said surfactant is a mixture of $C_{10-16}$ alkylethoxysulfate with an average of about 0.6 moles of ethoxylate, $C_{10-16}$ alkyldimethyl amine oxide, $C_{11}$ alcohol ethoxylate $(EO)_9$ nonionic surfactant.

The cleaning paste may also comprise of from about 2% to about 15%, preferably of from about 3% to about 10%, and most preferably about 6% by weight of the total cleaning paste of fumed silica. It has been found that the presence of fumed silica aids to bind free water and assists in the aging, drying, and structuring characteristics of the surfactant paste. Suitable fumed silicas are commercially available; an example is Cab-o-Sil M5® from Cabot Corporation.

The surfactant component of the cleaning paste may comprise from about 15% to about 100%, preferably of from about 20% to about 85%, more preferably of from about 25% to about 60% by weight of the total cleaning paste of surfactant.

Optional Ingredients

Water

As an optional although preferred ingredient the cleaning paste according to the present invention comprises water.

The cleaning paste may comprise of from about 0.01% to about 70%, preferably of from about 10% to about 60%, more preferably of from about 15% to about 55% by weight of the total paste of water.

As outlined above, water may evaporate from the cleaning paste once applied onto the substrate.

Diamines

An optional although preferred ingredient of the cleaning paste according to the present invention is a diamine. The cleaning paste will preferably contain at least about 0.1%, more preferably at least about 0.2%, even more preferably, at least about 0.25%, even more preferably still, at least about 0.5% by weight of said composition of diamine. The composition will also preferably contain no more than about 15%, more preferably no more than about 10%, even more preferably, no more than about 6%, even more preferably, no more than about 5%, even more preferably still, no more than about 1.5% by weight of said composition of diamine.

Water-Transfer Agent/Structurant

The cleaning paste preferably comprises a water-transfer agent or structurant. The structurant/water-transfer agent is capable of withdrawing water from the surfactant in the cleaning paste. This has the benefit of improving surfactant mileage, i.e. controlling release of surfactant from the wipe. We believe that such a structurant assists in achieving this benefit in several ways. First, the water-transfer agent can remove water from the surfactant bulk phase and thereby structure the surfactant system. In particular it is preferred that the water transfer agent induces the surfactant to take up the lamellar insoluble form. Secondly, the water-transfer agent can promote bonding between the surfactant and the water-soluble thickening polymer. Thirdly, the water-transfer agent may also increase the viscosity and yield value of the surfactant-containing composition, limiting water ingress to the surfactant-containing composition bulk layer.

We believe also the water transfer agent acts as a conduit for the evaporation of water from the composition and can increase the rate of water loss from the composition, further contributing to control of release.

By "capable of withdrawing water from the surfactant" it is meant that there is a greater affinity between water and the water-transfer agent than there is between water and the surfactant.

In a preferred embodiment of the invention the water-transfer agent is selected from the group consisting of inorganic oxides and salts, especially hydratable oxides and salts, in particular oxides and salts of silicon, aluminium, zinc, boron, phosphorus, alkaline earth metals and alkali metals and mixtures thereof. Examples include silicates, silicic acid and silica, citric acid, citrates, sodium and potassium tripolyphosphates, sodium and potassium sulfates, magnesium and calcium sulfates. Preferably, the water-transfer agent is selected from the group consisting of silica, salts of magnesium and mixtures thereof.

More preferably the water-transfer agent is silica, preferably amorphous fumed silica. Hydrophobic silica does not act as water transfer agent as it does not possess the necessary hydrophilicity.

Preferably the water transfer agent has surface area measured by BET (described in DIN 66131 and as originally described in JACS, Vol. 60, 1938, p309 by Brunauer, Emmet and Teller) of from 5 to 800 m$^2$/g. More preferably the water-transfer agent has a surface area of from 100 to 400 m$^2$/g.

In an alternative preferred embodiment, the silica has an average particle size of from 0.05 to 1 μm, preferably from 0.2 to 0.3 μm.

Preferably the composition applied to the substrate comprises from 2.5 to 15% water-transfer agent, more preferably 5 to 10% and most preferably about 6%.

Polymeric Suds Stabilizer

The cleaning paste of the present invention may optionally contain a polymeric suds stabilizer. These polymeric suds stabilizers provide extended suds volume and suds duration without sacrificing the grease cutting ability of the liquid detergent compositions.

Other Optional Ingredients

The cleaning paste may comprise additional ingredients selected from the group consisting of thickening polymers, film-forming polymers, colorants, perfume and perfume delivery agents, stabilizers, solvents, density control agents, drying agents, hydrotropes, salt, solidification agents, preservation agents, water spotting/filming/drying control agents, and mixtures thereof.

In a highly preferred embodiment according to the present invention, the cleaning paste additionally comprises 1,3-bisaminomethyl cyclohexane, magnesium and/or calcium ions, and poly(dimethylaminoethyl methacrylate) acetate.

Methods of Manufacture

The wipes of the present invention are manufactured by adding the cleaning paste to the second layer herein via a conventional method which may include, but is not limited to, sprinkling, dip coating, spraying, slot coating, and roll transfer (e.g., pressure roll or kiss roll). The sheet of the remaining layer or layers, when present, is then placed on the sheet of the second layer, preferably, but not always, over the cleaning paste. The sheets are preferably sealed together by heat spot sealing. The abrasive coating may be applied onto the second layer by screen printing a thermoplastic material (preferably a hot melt adhesive). The sealed sheets are then partitioned into units for the consumer's use. Optional manufacturing steps may include calendaring to flatten the article, drying, creping, shrinking, stretching, or otherwise mechanically deforming.

Process of Cleaning Dishware and a Hard Surface

The present invention also encompasses a process of cleaning dishware, preferably to a process of cleaning dishware by hand.

This process comprises the steps of: a) wetting the wipe according to the present invention with water and b) contacting the dishware with the wetted wipe.

Additionally the process of cleaning dishware herein additionally comprises the step of mechanically agitating the wipe over said dishware (wiping) and/or rinsing said dishware with water.

In a preferred embodiment, the present invention also relates to a process of cleaning a hard surface, preferably a kitchen hard surface. The process of cleaning a hard surface comprises the steps of: a) wetting the wipe according to the present invention with water and b) contacting the hard surface with the wetted wipe. Additionally the process of cleaning a hard surface herein additionally comprises the step of mechanically agitating the wipe over said hard surface (wiping) and/or rinsing said hard surface with water.

The wipes of the present invention are water-activated and are therefore intended to be wetted with water prior to use. As used herein, "water-activated" means that the present invention is presented to the consumer in dry form to be used after wetting with water. Accordingly, the article is wetted by immersion in water or by placing it under a stream of water.

EXAMPLES

The following examples further describe and demonstrate embodiments within the scope of the present invention. In the following examples, all ingredients are listed at an active level. The examples are given solely for the purpose of illustration and are not to be construed as limitations of the present invention, as many variations thereof are possible without departing from the spirit and scope of the invention.

Example 1

Prepare a representative disposable dish care and hard surface cleaning wipe article in the following manner:

The first layer substrate is a spunlace blend of 40% viscose rayon and 60% polypropylene fibers, having a basis weight of about 60 gsm. The second layer is an air-laid, lofty, low density polyester batting. The polyester batting has a basis weight of 85 gsm and is comprised of a blend of fibers of about 23 microns, 17 microns and 40 microns average diameter, at least some of which are crimped. The thickness of the batting is about 0.1 to 0.2 in. measured at 5 gsi (grams per square inch).

The abrasive coating is added to a low density batting in a process called screen printing in an off line process prior to surfactant coating. The coating material (NW1034®) from HB Fuller is melted at about 280° F. and pumped through a hot melt tank, hoses and slot die. At the die, the molten material is forced into a porous screen. On the opposite side of the screen, the hot melt transfers to the batting and is subsequently air cooled before winding. The pattern on the screen determines the final screen print pattern of hot melt on the batting.

Prepare a cleaning paste, which includes the following components.

| Component | Wt % |
| --- | --- |
| Surfactant Premix | |
| Sodium Alkyl Ethoxy$_{0.6}$ Sulfate | 43.91 |
| $C_{10-16}$ dimethyl amine oxide | 9.93 |
| $C_{11}E_9$ nonionic | 4.97 |
| Diamine[1] | 0.83 |
| Poly DMAM[2] | 0.33 |
| Fumed Silica | 6.0 |
| Perfume | 2.0 |
| Blue Dye | 0.000872 |
| Yellow Dye | 0.0000884 |
| Water | q.s. |

Add the fumed silica to the surfactant premix while stirring continuously. Add the remaining aesthetic ingredients under agitation. The cleaning paste advantageously is easy to process with substrate layers and requires no further drying. The cleaning paste is applied to one side of the batting layer of the substrate by extruding it through a coating head continuously in five lines about 12 mm wide separated by a distance of 20 mm, measuring widthwise across the web, making parallel lines on each side of the web. The cleaning paste is extruded at a rate to yield 7.5 grams of cleaning paste per finished article.

The second layer that already carries the cleaning paste (see above) is continuously fed over the first substrate placing the first layer in contact with the surfactant-containing layer. The webs are continuously fed to an ultrasonic sealer, which seals a tilde shaped dot pattern comprising a grid of 8 mm long sealing points spaced evenly across the web. The web is cut into individual articles measuring about 120 mm×160 mm rectangles with rounded corners, which has a total of about 70 sealing points per article.

Example 2

Prepare a representative disposable dish care and hard surface cleaning wipe article in the same manner as in Example 1 except that the cleaning paste is applied to one side of the batting layer of the substrate by extruding it through a coating head continuously in five lines about 8 mm wide separated by a distance of 16 mm, measuring widthwise across the web, making parallel lines on each side of the web.

Example 3

The web of Example 1 or the web of Example 2 can also be cut into individual articles measuring about 105 mm×140 mm with rounded corners.

The disclosure of all patents, patent applications (and any patents which issue thereon, as well as any corresponding published foreign patent applications), and publications mentioned throughout this description are hereby incorporated by reference herein. It is expressly not admitted, however, that any of the documents incorporated by reference herein teach or disclose the present invention.

It should be understood that every maximum numerical limitation given throughout this specification will include every lower numerical limitation, as if such lower numerical limitations were expressly written herein. Every minimum numerical limitation given throughout this specification will include every higher numerical limitation, as if such higher numerical limitations were expressly written herein. Every numerical range given throughout this specification will include every narrower numerical range that falls within such broader numerical range, as if such narrower numerical ranges were all expressly written herein.

While particular embodiments of the subject invention have been described, it will be obvious to those skilled in the art that various changes and modifications of the subject invention can be made without departing from the spirit and scope of the invention. In addition, while the present invention has been described in connection with certain specific embodiments thereof, it is to be understood that this is by way of illustration and not by way of limitation and the scop It will be clear to those skilled in the art that various changes and modifications may be made without departing from the scope of the invention and the invention is not to be considered limited to the embodiments and examples that are described in the specification is defined by the appended claims which should be construed as broadly as the prior art will permit.

What is claimed is:

1. A disposable dish care and hard surface cleaning wipe comprising:
   a water insoluble substrate comprising:
   1) a first layer, wherein said first layer is a partially hydrophobic nonwoven; and a second layer, wherein said second layer is a low density nonwoven and wherein said second layer is adjacent to said first layer and has molded onto the side facing away from said first layer an abrasive coating of thermoplastic material nubs or hooks; and
   b) a cleaning paste comprising a surfactant.

2. A wipe according to claim 1 wherein said disposable wipe is a disposable dish care wipe.

3. A wipe according to claim 1 wherein said water insoluble substrate additionally comprises a third substantially water-impermeable layer located between said first layer and said second layer, wherein said third substantially water-impermeable layer is a plastic film.

4. A wipe according to claim 1 wherein said layers are bonded together by spot bonds.

5. A wipe according to claim 1 wherein said first layer is a carded, spunlaced partially hydrophobic nonwoven.

6. A wipe according to claim 1 wherein the partially hydrophobic nonwoven first layer comprises at least about 40% synthetic fibers.

7. A wipe according to claim 1 wherein the partially hydrophobic nonwoven first layer comprises polypropylene and rayon fibers.

8. A wipe according to claim 1 wherein said second layer is a batting layer.

9. A wipe according to claim 1 wherein said second layer has a loft of at least about 1 mm.

10. A wipe according to claim 1 wherein said second layer has a density of from about 0.00005 g/cm$^3$ to about 0.1 g/cm$^3$.

11. A wipe according to claim 1 wherein said second layer is made of a high loft, low density nonwoven.

12. A wipe according to claim 11 wherein said high loft, low-density nonwoven comprises polyethylene terephthalate (PET) and bicomponent sheath core fibers made from polyethylene (PE) and polyethylene terephthalate (PET).

13. A wipe according to claim 1 wherein said abrasive coating of thermoplastic material nubs or hooks is applied in an about 8 dot per square inch pattern.

14. A wipe according to claim 1 wherein said abrasive coating of thermoplastic material nubs or hooks covers said second layer substantially regularly.

15. A wipe according to claim 1 said thermoplastic material for use as abrasive coating is a thermoplastic polymer.

16. A wipe according to claim 1 wherein said nubs or hooks have a substantially globular shape having a diameter of at least about 200 micrometers.

17. A wipe according to claim 1 wherein said abrasive coating of thermoplastic material nubs or hooks is applied onto said second layer by screen printing.

18. A wipe according to claim 1 wherein said abrasive coating of thermoplastic material has a lower melting point than the low density nonwoven second layer.

19. A wipe according to claim 1 wherein said cleaning paste comprises a surfactant selected from the group consisting of: anionic surfactant, zwitterionic surfactant, and nonionic surfactant, and mixtures thereof.

20. The wipe of claim 19 wherein said surfactant is selected from the group consisting of: alkyl ethoxylate sulfate anionic surfactants, amine oxide surfactants, and mixtures thereof.

21. A wipe according to claim 1 wherein said cleaning paste comprises a $C_{10-16}$ alkylethoxysulfate with an average of about 0.6 moles of ethoxylate, a $C_{10-16}$ alkyldimethyl amine oxide, and a $C_{11}$ alcohol ethoxylate $(EO)_9$, nonionic surfactant.

22. A wipe according to claim 1 wherein said cleaning paste further comprises a compound selected from the group consisting of: polymeric suds stabilizer, diamines, and magnesium and/or calcium ions, and mixtures thereof.

23. A wipe according to claim 1 wherein said cleaning paste is applied onto said second layer on the side facing said first layer.

24. A wipe according to claim 23 wherein said cleaning paste is equally distributed over the full surface of said second layer or applied onto a part of the surface of said second layer.

25. A wipe according to claim 1 wherein said cleaning paste covers at least about 30% of the surface of at least one of the layers of said wipe.

26. A wipe according to claim 1 wherein said cleaning pasta is applied in a stripe pattern onto at least one of the layers of said wipe.

27. A wipe according to claim 26 wherein said stripe pattern comprises one or more stripes.

28. A wipe according to claim 27 wherein said one or more stripes extend over the full length of the substrate.

29. A wipe according to claim 27 wherein said one or more stripes have a width of at least about 3 mm.

30. A wipe according to claim 1 wherein said wipe is dry-to-the-touch.

31. A wipe according to claim 1 wherein said wipe is substantially dry.

32. A wipe according to claim 1 wherein the cleaning paste comprises a water-transfer agent capable of withdrawing water from the surfactant.

33. A wipe according to claim 32 in which the water-transfer agent is selected from the group consisting of inorganic oxides and salts.

34. The wipe of claim 33 wherein said water-transfer agent comprises hydratable oxides and salts, such as the oxides and salts of silicon, aluminium, zinc, boron, phosphorus, alkaline earth metals, alkali metals, and mixtures thereof.

35. A wipe according to claim 32 in which the water-transfer agent comprises silica.

36. A wipe according to claim 35 in which the silica has a surface area measured by BET of from about 50 to about 800 m$^2$/g.

37. A wipe according to claim 35 in which the silica has an average particle size of from about 0.05 to about 1 μm.

38. A process of cleaning dishware which comprises the steps of wetting the disposable dish care wipe according to claim 1 with water and contacting the dishware with said wetted wipe.

* * * * *